United States Patent
Lin et al.

(10) Patent No.: US 8,045,164 B2
(45) Date of Patent: Oct. 25, 2011

(54) POSITION FINDING SYSTEM AND METHOD FOR USE IN ALIGNING LASER DEVICE WITH AN OPTICAL FIBER

(75) Inventors: Kai-Sheng Lin, Sugar Land, TX (US);
Chong Wang, Stafford, TX (US);
I-Lung Ho, Missouri City, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 241 days.

(21) Appl. No.: 12/171,102

(22) Filed: Jul. 10, 2008

(65) Prior Publication Data
US 2010/0007884 A1    Jan. 14, 2010

(51) Int. Cl.
*G01B 11/00*    (2006.01)

(52) U.S. Cl. ............... 356/399; 356/400; 356/401

(58) Field of Classification Search .......... 356/399–401; 385/49, 52
See application file for complete search history.

(56) References Cited

U.S. PATENT DOCUMENTS

| | | | |
|---|---|---|---|
| 5,087,109 A | 2/1992 | Ishizuka et al. | |
| 5,666,450 A | 9/1997 | Fujimura et al. | |
| 5,916,458 A * | 6/1999 | Komoriya et al. | 219/121.63 |
| 5,926,594 A | 7/1999 | Song et al. | |
| 5,963,696 A | 10/1999 | Yashida et al. | |
| 6,325,551 B1 | 12/2001 | Williamson, III et al. | |
| 6,341,187 B1 | 1/2002 | Wu et al. | |
| 6,470,120 B2 | 10/2002 | Green et al. | |
| 6,608,959 B2 | 8/2003 | Jang et al. | |
| 6,690,865 B2 | 2/2004 | Miyazaki | |
| 6,813,023 B2 * | 11/2004 | Shekel et al. | 356/400 |
| 7,136,552 B2 | 11/2006 | Luo et al. | |

* cited by examiner

*Primary Examiner* — Tarifur Chowdhury
*Assistant Examiner* — Isiaka Akanbi
(74) *Attorney, Agent, or Firm* — Grossman Tucker Perreault & Pfleger, PLLC; Norman S. Kinsella

(57) ABSTRACT

A position finding system and method may be used to find an alignment position of a laser device relative to an optical fiber such as an angled optical fiber. The laser device may be positioned "off-axis" relative to the optical fiber such that light from the laser device is directed at an angle to an end of the optical fiber and coupled into the optical fiber. The position finding system and method may be used to find the alignment position by searching for relative high power positions at different angular orientations of the laser device and calculating coordinates of at least one alignment position from the coordinates of the relative high power positions. The relative high power positions may be positions at which the measured power coupled into the optical fiber by the laser is maximized.

20 Claims, 4 Drawing Sheets

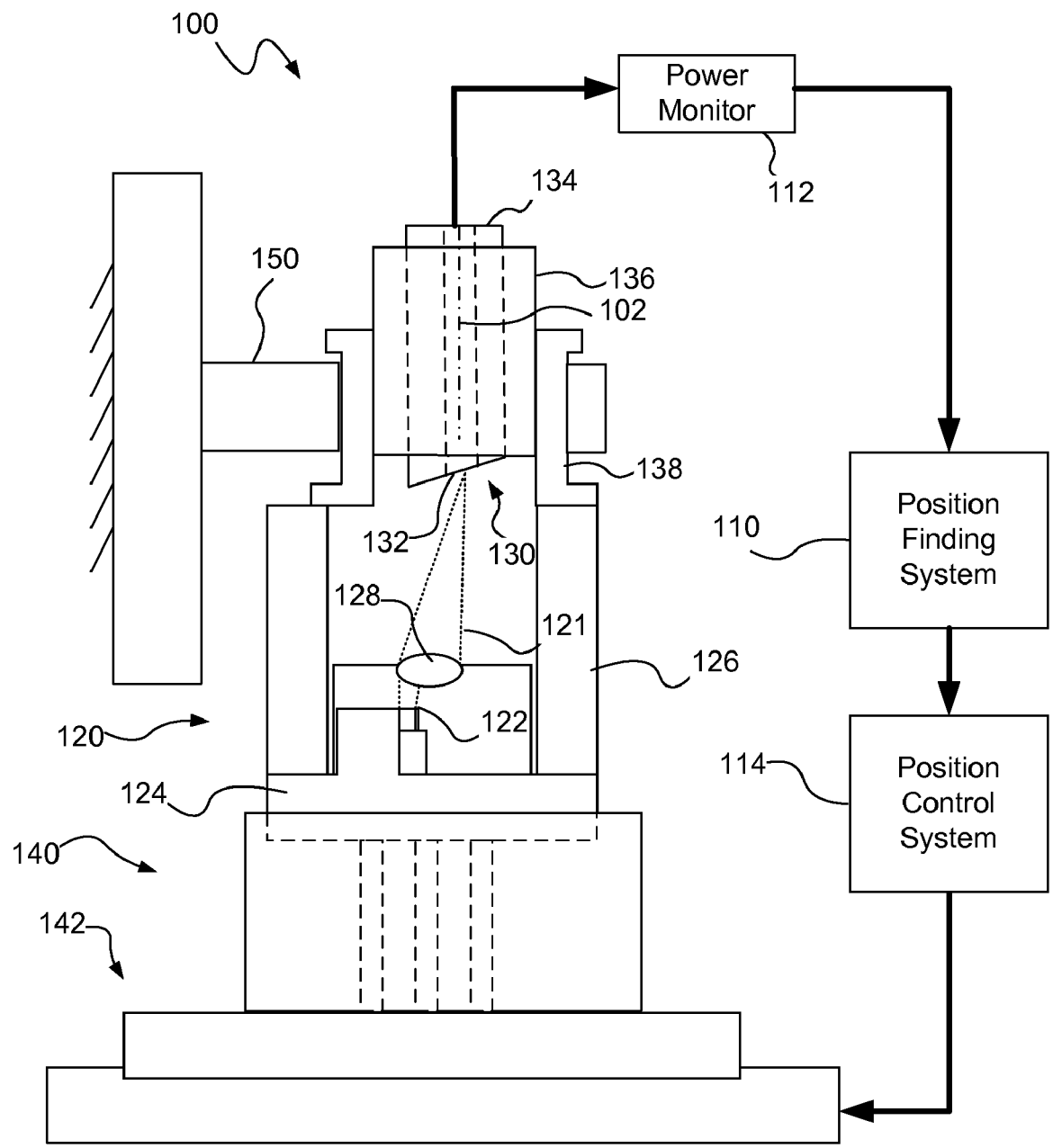
FIG. 1
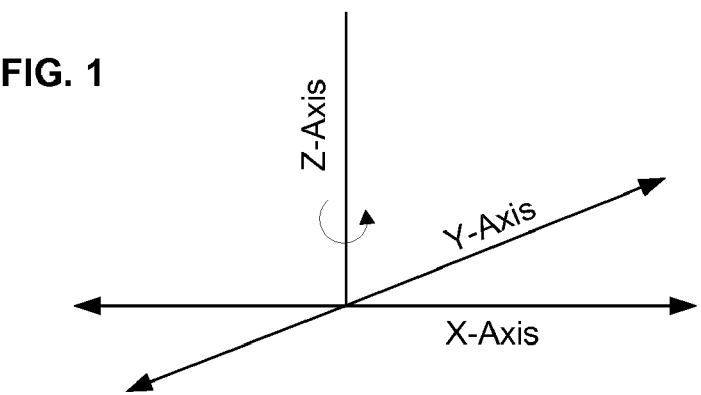

POSITION FINDING SYSTEM AND METHOD FOR USE IN ALIGNING LASER DEVICE WITH AN OPTICAL FIBER

TECHNICAL FIELD

The present invention relates to aligning lasers with optical fibers and in particular, to a position finding system and method for use in aligning a laser device with an angled optical fiber.

BACKGROUND INFORMATION

The following descriptions and examples are not admitted to be prior art by virtue of their inclusion within this section.

Semiconductor lasers are used in a variety of applications, such as high-bit-rate optical fiber communications. To provide optical fiber communications, lasers are optically coupled to fibers to enable modulated light output from the laser to be transmitted into the fiber. Various modules, assemblies or packages are used to hold and align the laser, other optical components (e.g., collimation and coupling lenses, isolators, and the like), and optical fiber such that the laser is optically coupled to the fiber. The process of aligning an optical fiber to a laser and fixing it in place is sometimes referred to as fiber pigtailing. The laser and optical fiber may be aligned and coupled, for example, using a welding machine. Active alignment techniques may be used wherein the power of the light coupled into the optical fiber is measured as the laser and/or fiber is moved to search for the alignment position (e.g., a position of maximum power).

Standard laser package types include butterfly laser packages and coaxial or TO (transistor outline) can laser packages. In a TO can laser package, for example, the laser (e.g., a laser diode) and the light-receiving end of the optical fiber may be mounted together within a substantially cylindrical housing. The laser may be mounted on a laser submount on a TO can post of a TO can header. The fiber end may be disposed in a rigid cylindrical ferrule, which may be welded to the TO can housing after the laser and the optical fiber are aligned.

In this and other types of laser packages, one problem that often arises when a laser is coupled to an optical fiber is back reflection from the end face of the fiber back into the laser cavity. One way to reduce back reflection is to use an angle-polished fiber, which has its end surface polished to a fiber end angle (e.g., 8°) slightly off of the plane normal to the axis of the fiber core. Light from the laser that reflects off of the fiber end, instead of being coupled into the fiber, is reflected at an angle with respect to the axis of the fiber and is thus not reflected back into the laser cavity. One drawback of this approach, however, is that coupling efficiency may be reduced. A primary reason for this reduction in coupling efficiency is that the angled fiber end causes light coupled into the fiber core at the angled end to be bent at a certain refraction angle due to the different indices of refraction of the fiber and surrounding medium (e.g., air). As a result, the light is not coupled into the fiber substantially parallel to the axis of the fiber core, which reduces coupling efficiency.

To improve the coupling efficiency, the light from the laser may be directed at an angle to the angled end of the fiber such that the light coupled into the fiber core is better aligned with the axis of the fiber core. To direct the light at an angle to the angled end of the fiber, the laser may be positioned "off axis" relative to the axis of the fiber core. With such an "off-axis" configuration, aligning a laser relative to the angle-polished fiber may be more difficult. Because the laser is "off-axis" relative to the optical fiber to direct the light at an angle, the proper alignment of the laser is more sensitive to the angular position of the laser. When the laser package is positioned in a welding machine, for example, there may be a rotational shift in the alignment position of the laser, resulting in misalignment. Slight deviations from an alignment position (e.g., a position of maximum power) may result in a significant drop in measured power.

When the laser is "off-axis" relative to the optical fiber to direct the light at an angle to the angled end of the fiber, the use of existing active alignment techniques, such as randomly searching power, may require additional time to find maximum power at different angles. In one system, for example, randomly searching power may require 20 to 25 seconds to find maximum power and position after each rotation and power must be checked at different angles at least 5 times. Such techniques often take considerable amounts of time to find the desired position.

BRIEF DESCRIPTION OF THE DRAWINGS

These and other features and advantages will be better understood by reading the following detailed description, taken together with the drawings wherein:

FIG. 1 is a diagrammatic view of an alignment system for aligning a laser device with an optical fiber, consistent with embodiments of the present invention.

DETAILED DESCRIPTION

Figure 2:
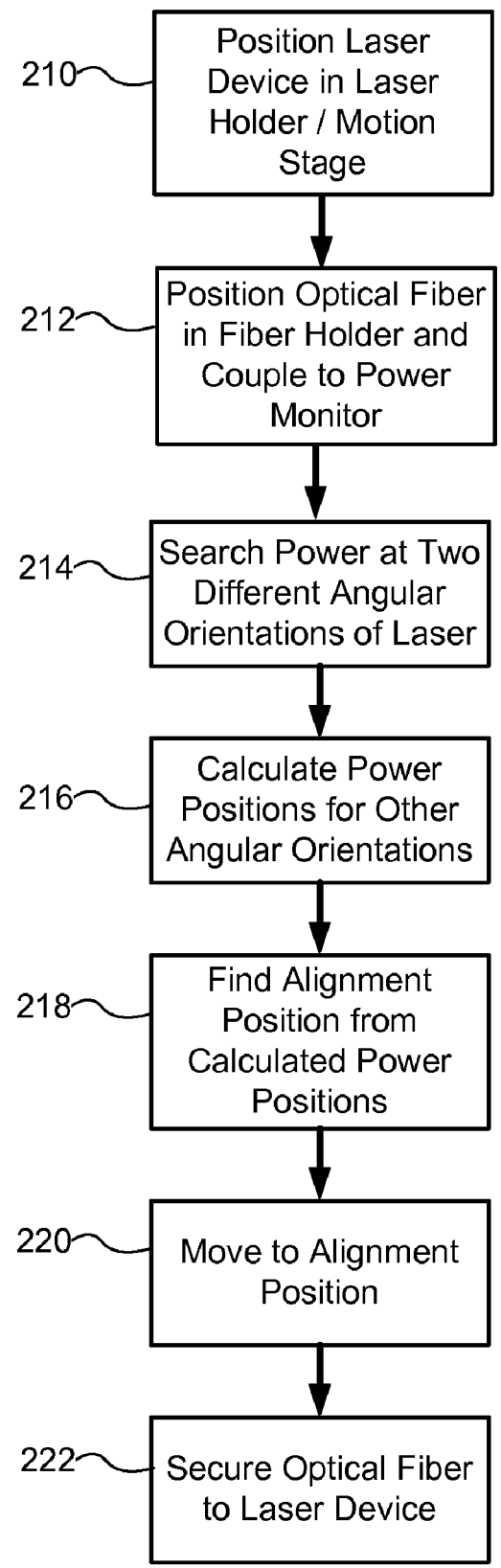
FIG. 2 is a flow chart illustrating a method of coupling a laser device and optical fiber, consistent with an embodiment of the present invention.

A position finding system and method, consistent with embodiments of the present invention, may be used to find an alignment position of a laser device relative to an optical fiber such as an angled optical fiber. The laser device may be positioned "off-axis" relative to the optical fiber such that light from the laser device is directed at an angle to an end of the optical fiber and coupled into the optical fiber. The position finding system and method may be used to find the alignment position by searching for relative high power positions at different angular orientations of the laser device and calculating coordinates of at least one alignment position from the coordinates of the relative high power positions. The relative high power positions may be positions at which the measured power coupled into the optical fiber by the laser is maximized. As used herein, the term "coupled" may refer to mechanical, optical and/or electrical coupling and does not imply a direct coupling or connection unless otherwise specified.

Referring to FIG. 1, an alignment system 100 including a position finding system 110 is described in greater detail. The position finding system 110 may be used to find the alignment position of a laser device 120 relative to an angle-polished optical fiber 130. Although the exemplary embodiment refers to an angle-polished fiber 130, the system and method described herein may be used to align other non-angled fibers. The alignment system 100 may be implemented in a welding system used to align and weld components that secure the angled-polished optical fiber 130 to the laser device 120.

Examples of such welding systems include the laser welding systems available from Suruga Seiki.

A laser holder 140 may be used to hold the laser device 120 and a motion stage 142 may be used to move the laser device 120 relative to the optical fiber 130. In the exemplary embodiment, the motion stage 142 provides motion in at least the X, Y, and $\theta_z$ axes, although the motion stage may also provide motion in the Z axis. An optical fiber holder 150 may be used to hold the optical fiber 130. Although the optical fiber holder 150 holds the optical fiber 130 in a fixed position in the exemplary embodiments, the optical fiber holder 150 may also provide motion, for example, in the X, Y, Z, and/or $\theta_z$ axes. The laser device 120, the optical fiber 130, the laser device holder 140, the motion stage 142, and the optical fiber holder 150 are shown schematically. Those skilled in the art may appreciate that different configurations are possible.

The alignment system 100 may also include a power monitor 112 coupled to the optical fiber 130 and the position finding system 110. The power monitor 112 measures the power of the light coupled into the optical fiber 130 and provides power information to the position finding system 110. The alignment system 100 may further include a position control system 114 coupled to the position finding system 110 and the motion stage 140. The position control system 114 obtains positioning information from the position finding system 110 and causes the motion stage 140 to move to in response to the positioning information. The position finding system 110 and position control system 114 may be implemented using hardware, software, firmware, or any combination thereof.

In the exemplary embodiment, the laser device 120 is a TO can type laser package including a laser diode 122 mounted to a TO can header 124 with a substantially cylindrical TO can housing 126 around the laser diode 122. The position finding system and method described herein may also be used with other types of laser devices or laser packages including, but not limited to, other types of coaxial laser packages and butterfly laser packages. In the exemplary embodiment, a lens 128 is mounted in front of the laser diode 122 to focus and direct the laser light 121 from the laser diode 122 at an angle relative to the axis 102 of the optical fiber 130. Because the face 132 of the optical fiber 130 is angled, the laser 122 may be aligned with the optical fiber 130 such that the laser light 121 enters the optical fiber 130 and refracts substantially in alignment with the axis 102. The laser diode 122 is thus aligned "off-axis" relative to the axis 102 of the optical fiber 130.

In the exemplary embodiment, the optical fiber 130 is coupled to the TO can housing 126 of the laser device 120 using a coupling sleeve 138. The TO can housing 126 and the coupling sleeve 138 may be configured to move relative to each other during alignment and may be welded to secure the optical fiber 130 into alignment with the laser device 120. The optical fiber 130 may be located in one or more ferrule portions 134, 136 that are coupled to the fiber coupling sleeve 138. The position finding system and method described herein may also be used with other types of structures for securing the optical fiber and coupling the optical fiber to the laser device.

Referring to FIG. 2, one method of coupling a laser device and optical fiber is described in greater detail. The laser device (e.g., laser device 120) may be positioned 210 in a laser holder (e.g., laser holder 140) coupled to a motion stage (e.g., motion stage 142). The optical fiber (e.g., optical fiber 130) may be positioned 212 in a fiber holder (e.g., fiber holder 150) and coupled to a power monitor (e.g., power monitor 112). The laser device and optical fiber may be secured and coupled to the respective holders using techniques known to those skilled in the art. The laser device and optical fiber may also be positioned such that the structures (e.g., the TO can housing 126 and coupling sleeve 138) are in contact or at least sufficiently close to be secured together, for example, by welding.

When the laser device and optical fiber are in position in the respective holders, the alignment system may be operated to align the laser device and optical fiber. In general, power is searched 214 at two angular orientations of the laser device relative to the optical fiber and power positions for other angular orientations are calculated 216. To search power in each angular orientation, for example, the laser (e.g., laser 122) may be moved (e.g., in the X and Y axes) relative to the optical fiber (e.g., fiber 130) while monitoring the power coupled into the fiber from the laser (e.g., using power monitor 112) until a position of relatively high power (i.e., high relative to other positions) is identified. The laser may be moved, for example, along a path following a pattern (e.g., a raster or spiral pattern) and power may be measured and compared at multiple locations along the pattern. According to one embodiment, the relative high power positions are those positions at which the measured power is highest or maximum for a particular angular orientation.

From the relative high power positions, relative high power positions for other angular orientations may be calculated 216 (e.g., using position finding system 110). As described in greater detail below, the relative high power positions may form a circle and the calculated high power positions for other angular orientations may be calculated based on the coordinates on the circle. An alignment position may be found 218 from among the calculated power positions. The alignment position may be the calculated power position at which the measured power is highest or maximum as compared to other calculated power positions. The laser device may be positioned, for example, in multiple calculated power positions (e.g., around the circle) and power may be measured and compared at the multiple calculated power positions to determine the alignment position of maximum power.

The laser device may be moved 220 to the alignment position (e.g., using the position control system 114 and the motion stage 142). The optical fiber may then be secured 222 to the laser device while the laser device is maintained in the alignment position. In the exemplary embodiment, for example, a structure (e.g., the coupling sleeve 138) coupled to the optical fiber may be welded to a structure (e.g., the TO can housing 126) of the laser device. The alignment method may thus be used to help keep the welding spot at substantially the correct position during welding of the laser device to the optical fiber, thereby avoiding or reducing the need for manual adjustments by the operator.

Figure 3:
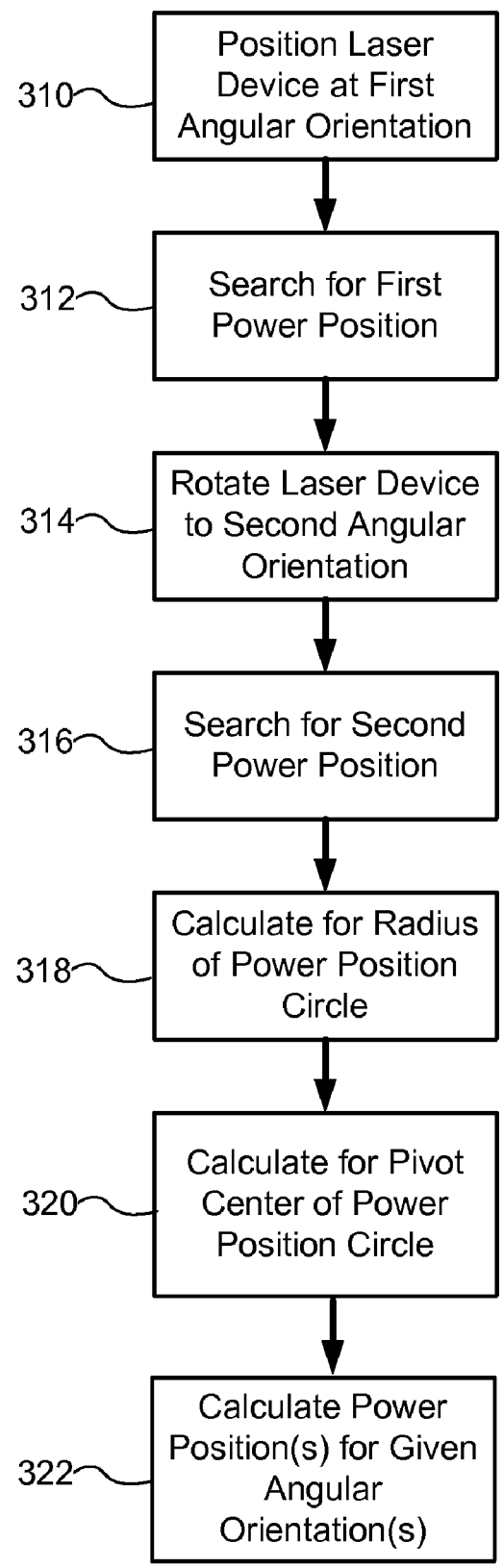
FIG. 3 is a flow chart illustrating a method of finding an alignment position of a laser device relative to an optical fiber, consistent with an embodiment of the present invention.
Figure 4:
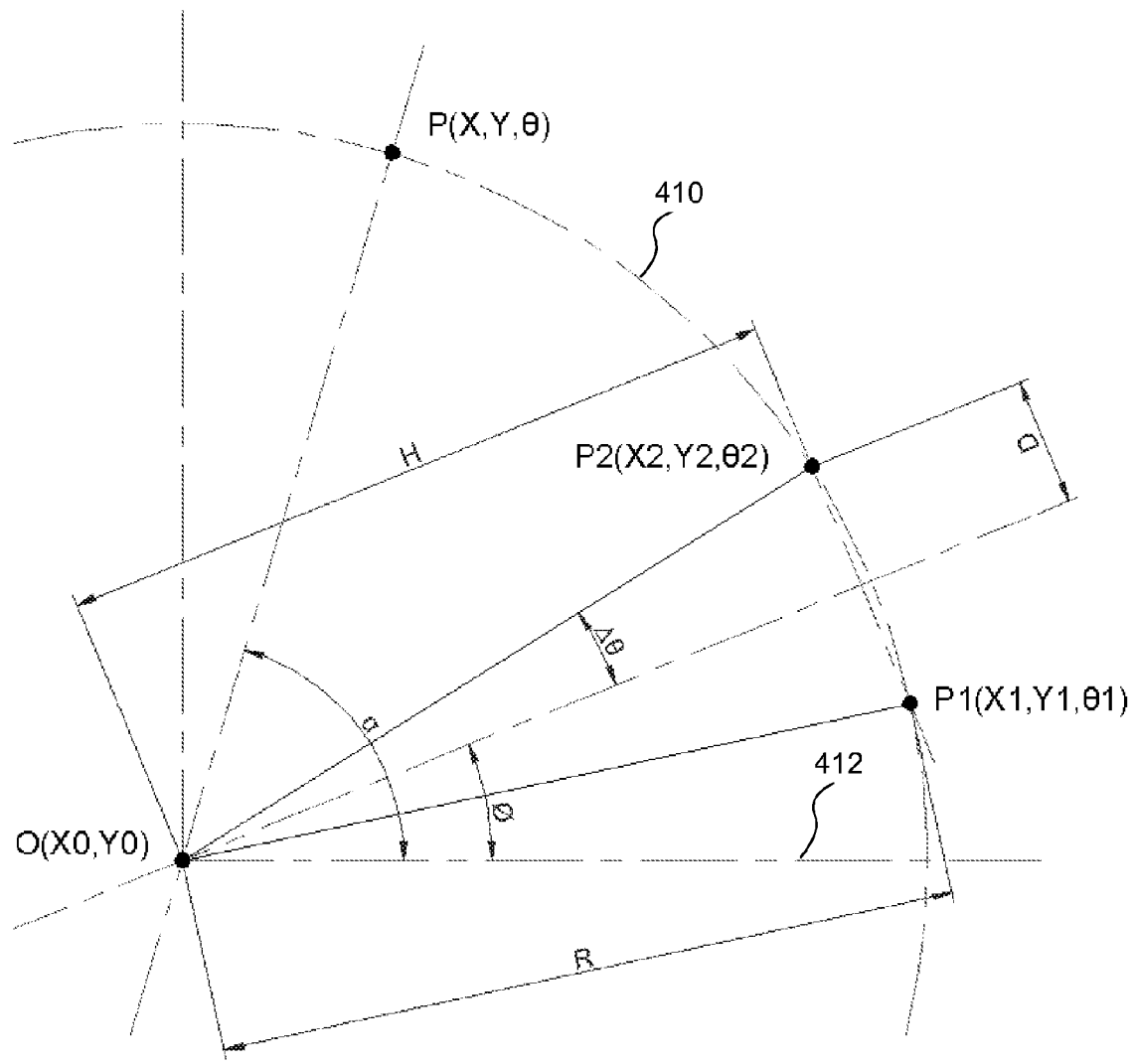
FIG. 4 is a diagram illustrating a relationship between positions of high relative power coupled into an optical fiber, consistent with one embodiment of the present invention.

Referring to FIGS. 3 and 4, the method of finding an alignment position is described in greater detail. FIG. 4 illustrates the relationship between relative high power positions P1, P2, P at which the power of the laser light coupled into the optical fiber is relatively high (e.g., maximum power) compared to other positions. First and second relative high power positions determined by searching power are represented as P1(X1, Y1, $\theta$1) and P2(X2, Y2, $\theta$2). The calculated relative high power position is represented as P(X, Y, $\theta$). Because the laser is "off-axis" relative to the optical fiber, the relative high power positions form a circle 410.

Initially, the laser may be positioned 310 at a first angular orientation with an angle $\theta$1 relative to a reference axis. Although the exemplary illustration shows an angle $\theta$1 relative to the X axis 412, other orientations and angles (including an angle $\theta$1=0) are possible.

At this first angular orientation, the system may search 312 for a first relative high power position. In particular, the laser may be moved in the X and Y directions (e.g., in a spiral or raster scanning pattern) while monitoring power until the relative high power position P1(X1, Y1, θ1) is identified. The relative high power position is the position at which the measured power (i.e., representing power coupled into the optical fiber) is higher than at other positions. In one embodiment, the relative high power position may be a maximum power position at which the measured power is the maximum relative to the power measured at other positions.

After obtaining coordinates for the first relative high power position, the laser may then be rotated 314 by a certain angle (Δθ) to a second angular orientation with an angle θ2, where $$\Delta\theta = \frac{\theta 2 - \theta 1}{2}.$$

At the second angular orientation, the system may search 316 for a second relative high power position. In particular, the laser may be moved in the X and Y directions while monitoring power until the relative high power position P2(X2, Y2, θ2) is identified.

With the coordinates (X1, Y1, θ1, X2, Y2, θ2) of the first and second relative high power positions P1, P2, a relative high power position P may be determined for any angle θ. Because of the "off axis" orientation of the laser relative to the optical fiber and the angle of the light directed to the optical fiber, the relative high power positions P1, P2, P should form a circle. To calculate the coordinates of the relative high power position P, a radius R may be calculated 318 and pivot center O(X0, Y0) may be calculated 320. The radius R may be calculated according to the following equations:

$$D = \frac{\sqrt{(X2 - X1)^2 + (Y2 - Y1)^2}}{2} \quad (1)$$

$$R = \frac{D}{\sin(\Delta\theta)} \quad (2)$$

The pivot center O(X0, Y0) may be calculated according to the following equations:

$$H = R \cdot \cos(\Delta\theta) \quad (3)$$

$$\phi = \tan^{-1}\left(\frac{X1 - X2}{Y2 - Y1}\right) \quad (4)$$

$$X0 = \frac{X1 + X2}{2} - H \cdot \cos\phi \quad (5)$$

$$Y0 = \frac{Y1 + Y2}{2} - H \cdot \sin\phi \quad (6)$$

From the radius R, the pivot center coordinates (X0, Y0), and a given angle θ, another relative high power position P may be calculated 322. The range of angles for the given angle θ may be all 360° and may be incremented by an increment in the range of about 10° to 30° depending upon the fiber type. When the fiber uses an isolator, for example, the variation of power with changes in the angle is large and thus smaller increments may be used. When an isolator is not used, the variation of power with changes in the angle is small and thus larger increments may be used. The other relative high power position may be calculated, for example, according to the following equations:

$$\alpha = \phi + \theta - \frac{\theta 1 + \theta 2}{2} \quad (7)$$

$$X = X0 + R \cdot \cos\alpha \quad (8)$$

$$Y = Y0 + R \cdot \sin\alpha \quad (9)$$

One or more steps of the alignment methods described herein may be implemented as a computer program product for use with a computer system, such as a computer system implementing the position finding system 110 shown in FIG. 1. Such implementations include, without limitation, a series of computer instructions that embody all or part of the functionality previously described herein with respect to the system and method. The series of computer instructions may be stored in any machine-readable medium, such as semiconductor, magnetic, optical or other memory devices, and may be transmitted using any communications technology, such as optical, infrared, microwave, or other transmission technologies. It is expected that such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web).

Those skilled in the art should appreciate that such computer instructions can be written in a number of programming languages for use with many computer architectures or operating systems. For example, preferred embodiments may be implemented in a procedural programming language (e.g., "C") or an object oriented programming language (e.g., "C++" or Java). Alternative embodiments of the invention may be implemented as pre-programmed hardware elements, firmware or as a combination of hardware, software and firmware.

Accordingly, the position finding system and method consistent with embodiments of the present invention may facilitate alignment of coupled light from a laser with a fiber axis in an optical fiber to improve coupling efficiency.

Consistent with one embodiment, a method is provided for finding an alignment position of a laser relative to an optical fiber. The method includes: searching for first and second relative high power positions of the laser with the laser at first and second angular orientations, respectively, the first and second relative high power positions being positions at which a measured power of the laser coupled into the optical fiber is high relative to other positions at the respective angular orientations; and calculating at least one other relative high power position at at least one other angular orientation, wherein the at least one other relative high power position is calculated from coordinates of the first and second relative high power positions.

Consistent with another embodiment, a method is provided for coupling an optical fiber to a laser device including a laser. The method includes: positioning the laser device in a laser holder coupled to a motion stage; positioning the optical fiber in a fiber holder and coupling the optical fiber to a power monitor; searching for first and second relative high power positions of the laser with the laser at first and second angular orientations, respectively, the first and second relative high power positions being positions at which a measured power of the laser coupled into the optical fiber is high relative to other positions at the respective angular orientations; calculating at least one other relative high power position at at least one other angular orientation, wherein the at least one other relative high power position is calculated from coordinates of the first and second relative high power positions; determining an alignment position of the laser from the at least one other relative high power position; moving the laser device such that the laser is positioned in the alignment position; and securing the optical fiber to the laser device with the laser maintained in the alignment position.

Consistent with a further embodiment, an alignment system includes a fiber holder configured to hold an optical fiber and a laser holder and motion stage configured to hold a laser and to move the laser relative to the optical fiber. The alignment system also includes a position control system coupled to the laser holder and motion stage and configured to control motion of the motion stage and a position of the laser relative to the optical fiber and a power monitor configured to be coupled to an optical fiber. The alignment system further includes a position finding system coupled to the power monitor and to the position control system. The position finding system is configured to search for first and second relative high power positions of the laser with the laser at first and second angular orientations, respectively. The first and second relative high power positions are positions at which a measured power of the laser coupled into the optical fiber is high relative to other positions at the respective angular orientations. The position finding system is configured to calculate other relative high power positions at other angular positions from coordinates of the first and second relative high power positions and to determine an alignment position of the laser from the other relative high power positions.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for finding an alignment position of a laser relative to an optical fiber, the method comprising:
   searching for at least first and second relative high power positions of the laser while moving the laser with the laser at first and second angular orientations, respectively, the first and second relative high power positions being positions of the laser at which a measured power of the laser light coupled into the optical fiber is high relative to other positions of the laser at the respective angular orientations;
   calculating at least one other relative high power position at least one other angular orientation, wherein the at least one other relative high power position is calculated from coordinates of the first and second relative high power positions, wherein the relative high power positions of the laser are "off-axis" relative to the optical fiber such that light is directed at an angle from the laser to the optical fiber; and
   determining the alignment position of the laser from the relative high power positions.

2. The method of claim 1 wherein calculating the at least one other relative high power position includes calculating a plurality of relative high power positions at a plurality of other angular orientations.

3. The method of claim 1 wherein searching for first and second relative high power positions comprises:
   positioning the laser at the first angular orientation relative to the optical fiber;
   moving the laser in x and y directions with the laser at the first angular orientation while emitting light from the laser and measuring power coupled into the optical fiber;
   identifying coordinates of the first relative high power position based on the measured power of the laser coupled into the optical fiber;
   rotating the laser relative to the optical fiber to the second angular orientation;
   moving the laser in x and y directions with the laser at the second angular orientation while emitting light from the laser and measuring power coupled into the optical fiber; and
   identifying coordinates of the second relative high power position based on the measured power of the laser coupled into the optical fiber.

4. The method of claim 1 wherein calculating at least one other relative high power position comprises:
   calculating a radius of a power position circle defined by the first and second relative high power positions;
   calculating coordinates of a pivot center of the power position circle; and
   calculating coordinates of another high power position for a given angular orientation based on the coordinates of the pivot center and the radius of the power position circle.

5. The method of claim 1 wherein the first and second relative high power positions are positions at which the measured power of the laser coupled into the optical fiber is a maximum relative to the measured power at other positions.

6. The method of claim 1 wherein the first and second relative high power positions and the at least one other relative high power position form a circle.

7. The method of claim 2 wherein determining the an alignment position comprises:
   positioning the laser at each of the plurality of relative high power positions;
   measuring power coupled into the optical fiber at the plurality of relative high power positions; and
   identifying one of the relative high power positions having maximum measured power as the alignment position.

8. The method of claim 1 wherein the fiber is an angled-polished fiber, and the alignment position of the laser is off-axis relative to the angled-polished fiber.

9. The method of claim 1 wherein the laser is located in a TO can laser package.

10. A method of coupling an optical fiber to a laser device including a laser located at an alignment position relative to the optical fiber, the method comprising:
    positioning the laser device in a laser holder coupled to a motion stage;
    positioning the optical fiber in a fiber holder and coupling the optical fiber to a power monitor;
    searching for at least first and second relative high power positions of the laser while moving the laser with the laser at first and second angular orientations, respectively, the first and second relative high power positions being positions at which a measured power of the laser coupled into the optical fiber is high relative to other positions at the respective angular orientations;
    calculating other relative high power positions at other angular orientations, wherein the other relative high power positions are calculated from coordinates of the first and second relative high power positions, wherein the relative high power positions of the laser are "off-axis" relative to the optical fiber such that light is directed at an angle from the laser to the optical fiber;

determining an alignment position of the laser from the relative high power positions;

moving the laser device such that the laser is positioned in the alignment position; and securing the optical fiber to the laser device with the laser maintained in the alignment position.

11. The method of claim 10 wherein securing the optical fiber to the laser device includes welding.

12. The method of claim 10 wherein searching for first and second relative high power positions comprises:

positioning the laser at the first angular orientation relative to the optical fiber;

moving the laser in x and y directions with the laser at the first angular orientation while emitting light from the laser and measuring power coupled into the optical fiber;

identifying coordinates of the first relative high power position based on the measured power of the laser coupled into the optical fiber;

rotating the laser relative to the optical fiber to the second angular orientation;

moving the laser in x and y directions with the laser at the second angular orientation while emitting light from the laser and measuring power coupled into the optical fiber; and identifying coordinates of the second relative high power position based on the measured power of the laser coupled into the optical fiber.

13. The method of claim 10 wherein calculating other relative high power positions comprises:

calculating a radius of a power position circle defined by the first and second relative high power positions;

calculating coordinates of a pivot center of the power position circle; and calculating coordinates of other high power positions for given angular orientations based on the coordinates of the pivot center and the radius of the power position circle.

14. The method of claim 10 wherein determining the alignment position comprises:

positioning the laser at each of the plurality of relative high power positions;

measuring power coupled into the optical fiber at the plurality of relative high power positions; and identifying one of the relative high power positions having maximum measured power as the alignment position.

15. An alignment system comprising:

a fiber holder configured to hold an optical fiber;

a laser holder and motion stage configured to hold a laser and to move the laser relative to the optical fiber;

a position control system coupled to the laser holder and motion stage and configured to control motion of the motion stage and a position of the laser relative to the optical fiber;

a power monitor configured to be coupled to an optical fiber; and a position finding system coupled to the power monitor and to the position control system, the position finding system being configured to search for at least first and second relative high power positions of the laser while moving the laser with the laser at first and second angular orientations, respectively, the first and second relative high power positions being positions at which a measured power of the laser coupled into the optical fiber is high relative to other positions at the respective angular orientations, the position finding system being configured to calculate relative high power positions at other angular positions from coordinates of the first and second relative high power positions and to determine an alignment position of the laser from the relative high power positions, wherein the relative high power positions of the laser are "off-axis" relative to the optical fiber such that light is directed at an angle from the laser to the optical fiber.

16. The alignment system of claim 15 wherein the motion stage is configured to provide motion in at least X, Y, and $\theta_z$, axes.

17. The alignment system of claim 15 wherein the position finding system is configured to calculate a radius of a power position circle defined by the first and second relative high power positions, to calculate coordinates of a pivot center of the power position circle, and to calculate coordinates of another high power position for a given angular orientation based on the coordinates of the pivot center and the radius of the power position circle.

18. A non-transitory machine-readable medium whose contents cause a computer system to perform a method for finding an alignment position of a laser relative to an optical fiber, said method comprising:

searching for at least first and second relative high power positions of the laser while moving the laser with the laser at first and second angular orientations, respectively, the first and second relative high power positions being positions at which a measured power of the laser coupled into the optical fiber is high relative to other positions at the respective angular orientations;

calculating at least one other relative high power position at least one other angular orientation, wherein the at least one other relative high power position is calculated from coordinates of the first and second relative high power positions, wherein the relative high power positions of the laser are "off-axis" relative to the optical fiber such that light is directed at an angle from the laser to the optical fiber; and determining the alignment position of the laser from the relative high power positions.

19. The non-transitory machine-readable medium of claim 18 wherein calculating the at least one other relative high power position includes calculating a plurality of relative high power positions at a plurality of other angular orientations.

20. The non-transitory machine-readable medium of claim 18 wherein calculating at least one other relative high power position comprises:

calculating a radius of a power position circle defined by the first and second relative high power positions;

calculating coordinates of a pivot center of the power position circle; and calculating coordinates of another high power position for a given angular orientation based on the coordinates of the pivot center and the radius of the power position circle.

* * * * *